US005611041A

United States Patent [19]

Bril et al.

[11] Patent Number: 5,611,041

[45] Date of Patent: Mar. 11, 1997

[54] MEMORY BANDWIDTH OPTIMIZATION

[75] Inventors: Vlad Bril, Campbell; Alexander Eglit, San Carlos; Sagar W. Kenkare, Fremont, all of Calif.

[73] Assignee: Cirrus Logic, Inc., Fremont, Calif.

[21] Appl. No.: 359,315

[22] Filed: Dec. 19, 1994

[51] Int. Cl.$^6$ .......... G06F 12/00

[52] U.S. Cl. .......... 395/507; 395/427; 395/840; 395/853; 395/872; 395/806; 345/185; 345/201

[58] Field of Search .......... 395/162–166, 395/154, 821, 828, 840, 853, 872, 733, 427; 345/132, 133, 153–155, 185, 196, 201; 348/571, 448, 446, 607, 469, 458, 459, 910, 714–716

[56] References Cited

U.S. PATENT DOCUMENTS

| | | | |
|---|---|---|---|
| 3,832,487 | 8/1974 | de Niet | 178/7.2 |
| 3,953,668 | 4/1976 | Judice | 178/6 |
| 4,012,772 | 3/1977 | Chambers et al. | 358/11 |
| 4,298,888 | 11/1981 | Colles et al. | 358/140 |
| 4,377,821 | 3/1983 | Sautter | 358/133 |
| 4,386,367 | 5/1983 | Peterson et al. | 358/140 |
| 4,400,719 | 8/1983 | Powers | 358/21 R |
| 4,412,251 | 10/1983 | Tanaka et al. | 358/160 |
| 4,455,572 | 6/1984 | Malden | 358/160 |
| 4,506,298 | 3/1985 | Mansell et al. | 348/571 |
| 4,649,378 | 3/1987 | Johnson et al. | 340/728 |
| 4,761,686 | 8/1988 | Willis | 358/160 |
| 4,799,105 | 1/1989 | Mitchell et al. | 358/160 |
| 4,924,315 | 5/1990 | Yamashita | 358/160 |
| 4,941,045 | 7/1990 | Birch | 358/140 |
| 4,941,127 | 7/1990 | Hashimoto | 365/189.01 |
| 4,991,122 | 2/1991 | Sanders | 345/153 |
| 4,996,595 | 2/1991 | Naito et al. | 358/150 |
| 5,019,904 | 5/1991 | Campbell | 358/140 |
| 5,034,814 | 7/1991 | Watsom | 358/141 |
| 5,099,327 | 3/1992 | Murakoshi | 358/140 |
| 5,136,385 | 8/1992 | Campbell | 358/160 |
| 5,136,584 | 8/1992 | Hedlund | 370/60 |
| 5,146,329 | 9/1992 | Flamm | 358/166 |
| 5,168,359 | 12/1992 | Mills | 358/140 |
| 5,182,643 | 1/1993 | Futscher | 358/140 |
| 5,218,432 | 6/1993 | Wakeland | 348/590 |
| 5,229,853 | 7/1993 | Myers | 358/140 |
| 5,274,753 | 12/1993 | Roskowski et al. | 345/116 |
| 5,301,263 | 4/1994 | Dowdell | 395/122 |
| 5,337,089 | 8/1994 | Fisch | 348/446 |
| 5,341,318 | 8/1994 | Balkanski et al. | 358/407 |
| 5,341,442 | 8/1994 | Barrett | 382/166 |
| 5,365,278 | 11/1994 | Willis | 348/581 |
| 5,422,996 | 6/1995 | Patil et al. | 395/164 |
| 5,440,683 | 8/1995 | Nally et al. | 395/164 |
| 5,493,648 | 2/1996 | Murray et al. | 395/164 |

FOREIGN PATENT DOCUMENTS

| | | | |
|---|---|---|---|
| 3-144492 | 6/1991 | Japan . | |
| 6-46299 | 2/1994 | Japan . | |
| 2211706 | 7/1989 | United Kingdom | G09G 1/16 |
| WO94/11854 | 5/1994 | WIPO . | |

OTHER PUBLICATIONS

TMS 34020, User's Guide, Aug. 1990, Chapter 6.

Gui–Accelerated SVGA LCD Controller for Portable Computers Cirrus Logic (CL–GD7541/GD7543) Dec. 1994.

*Primary Examiner*—Kee M. Tung

*Attorney, Agent, or Firm*—Robert Platt Bell & Associates, P.C.

[57] ABSTRACT

A memory controller, particularly for use in a video controller, is provided which reduces the effect of page misses during memory access. A video port FIFO is provided for buffering data from a video port to a display memory. A CRT FIFO is provided for buffering data from a display memory to a display. If, during a video port FIFO cycle, a page miss is encountered, the video port FIFO cycle is terminated and processing passes to a CRT FIFO CYCLE. If a page miss is encountered during a CRT FIFO cycle, the subsequent video port FIFO cycle will shortened by a number of memory cycles to compensate for the additional memory cycles required by the page miss. Additional data accumulated in the video port FIFO may be transferred to the display memory during a retrace interval. In this manner, memory bandwidth is optimized by removing a non-aligned page miss as the worst case of memory bandwidth utilization.

14 Claims, 2 Drawing Sheets

MEMORY BANDWIDTH OPTIMIZATION

CROSS-REFERENCE TO RELATED APPLICATIONS

The subject matter of this application is related to that in copending U.S. application Ser. No. 08/235,764 filed Apr. 29, 1994 entitled "Variable Pixel Depth and Format for Video Windows" and incorporated herein by reference.

FIELD OF THE INVENTION

The present invention is directed toward an apparatus and method for optimizing memory data bandwidth, particularly for use in a video controller for generating a video display incorporating motion video elements.

BACKGROUND OF THE INVENTION

Data may be transferred to and from a memory in a number of ways. A memory (e.g., DRAM) may be provided with a memory clock at a predetermined frequency to operate the memory. A random access memory cycle may be used to store or retrieve data from a randomly selected location in a memory. In this instance, the term "random" means that any memory address within the memory may be selected in a non-sequential fashion. Typically, a random access memory cycle may require six to nine memory clock cycles to execute, as the address of the memory location to be accesses must be latched and data then transferred to or from that memory location. The number of memory clock cycles for a random access memory cycle may depend on memory type.

A memory may also be accessed in other modes, for example page mode. In page mode, a number of sequential memory addresses may be accessed in sequence. A first random access memory cycle may be executed to access data from a first location in the memory. Subsequent cycles may then be executed simply by incrementing the address of the first random access memory cycle. The first random access memory cycle may require six or more memory clock cycles to execute, however, subsequent page mode cycles may require fewer memory clock cycles, for example, two.

Thus, the use of page mode cycles may significantly reduce the amount of time needed to transfer data to and from a memory, which conversely increases the capacity to transfer data, over time, to and from a memory. The data rate to and from a memory may be referred to as data bandwidth. The greater the data bandwidth, the greater the data flow rate capacity of a memory and accompanying I/O system.

One problem may occur when transferring data using page mode to and from a memory. As the name implies, page mode accesses data written to a single page, or series of addresses in the memory. If the end of a page is reached (i.e., the end of a range of addresses), a random access memory cycle may be required to access the first address of the next page of memory. Such an event may be referred to as a page miss or page break. The occurrence of a random access memory cycle in a stream of page mode memory cycles may interrupt data flow and/or reduce the data bandwidth of the memory and accompanying I/O system.

One technique for reducing the impact of page misses on the I/O system is to provide a very large FIFO at the input and output of the memory. A larger FIFO may reduce the number of memory clock cycles required to transfer a given amount of data, and thus partially compensate for the additional memory clock cycles required when a page miss occurs. While such a technique may be useful is reducing the impact of page misses on data flow, such large FIFOs may be costly and complex and may require a large amount of space in a semiconductor circuit.

Normally, the first cycle which fills a given FIFO in a system with multiple FIFOs connected to a DRAM is a random cycle. Subsequent cycles to and from the same FIFO may be paged if no page miss occurs. A large FIFO allows to make better use of the initial random cycle, but the impact of a non-aligned page miss is always the same. An extra number of memory clock cycles are needed to transfer the same amount of data.

For example, in a worse case, a random memory cycle may take a total of R memory clock cycles to execute, for example where R=9. A page mode cycle may take P memory clock cycles to execute, for example, where P=2. Thus, the number of additional memory clock cycles required when a page miss occurs is R–P or 7 cycles.

As a further example, a four stage FIFO will be compared with an eight stage FIFO. To execute eight aligned memory accesses for an four stage FIFO, a total of 2×(R+3P) memory clock cycles are required. For P=2 and R=7 (typical values) a total of 26 memory clock cycles may be required. To execute the same eight aligned memory accesses for an eight stage FIFO, a total of R+7P cycles may be required, or 21 memory clock cycles. Thus, in general, data may be transferred to or from a larger FIFO using fewer memory clock cycles than in a smaller FIFO.

However, for either sized FIFO, the impact of a page miss may introduce an equal number of additional memory clock cycles. If one page miss occurs during eight memory accesses for a four stage FIFO, a total of (2R+2P)+(R+3P) memory clock cycles are required. For P=2 and R=7 (typical values) a total of 31 memory clock cycles may be required. To execute the same eight memory accesses with one page miss for an eight stage FIFO, a total of 2R+6P cycles would be required, or 26 memory clock cycles. Thus, in either scenario, an additional five (R–P, where R=7 and P=2) memory clock cycles are required for each page miss which occurs.

For video display applications, data may be stored as pixel information in a memory, with each scan line of an image comprising a number of pixels (e.g., 600, 800, 1024). Note that if memory accesses are sequential only one page miss per scan line may occur if a page represents 512 accesses (512 addresses per page), each dword per access represents two pixels at 16 bit per pixel (bpp) resolution or less. For 24 or 32 bpp, more than one page miss may occur in one scan line.

Multimedia computers or PCs may be used to generate graphic graphics, text, video and signals. Of the four types of signals, video may be the most difficult to process in a computer, as the requirements for memory bandwidth and memory capacity are great.

Video controllers are known in the art to generate a television image on a computer video display. Such controllers may comprise, for example, a television tuner and signal generator connected to the output (analog) portion of a controller such as a VGA controller. While such systems may allow a computer monitor to be used as a television display, it may be difficult to integrate the television image with other displays (graphics, text or the like) in a true multimedia format.

In order to achieve high quality live action or full motion video (hereinafter "video") at least 15 or 16 bpp color resolution may be required (32K or 64K colors). High quality computer graphics are generally on the order of eight bpp, whereas texts modes may comprise four bpp. It is cost efficient to combine eight bpp graphics with 16 bpp or 15 bpp video (e.g., CD-ROM video playback). For 32 bit wide DRAMS, running 16 bpp graphics and 16 bpp video may lead to reduced performance and high cost due to the need for at least 2 MB of display memory. Combining 8 bpp graphics with 16 bpp video, however, may be achieved with 1 MB of display memory.

Thus, it remains a requirement in the art to generate a video display in a "window" within a graphics or text image on a computer display. One technique for generating such a video window is to provide an input port in a video controller to receive and digitize an input video image (or use a digitized video image) and store the image in display memory for processing with other graphical or text information. A display memory may be provided to store a predetermined amount of video data in order to compensate for the different data rates of the input data source and the output display.

For example, one frame of video data may be stored in display memory, which then may be referred to as a frame buffer. However, in order to provide realistic live action or full motion video, such a technique may exceed the memory bandwidth limitations of a conventional video controller. It may be possible to provide high speed memories, line or frame buffers and the like in an attempt to optimize memory bandwidth of conventional controllers. However, high speed memories are relatively costly and may not be suited for some applications (e.g., portable computer). Further, high speed memories and large buffers add additional complexity and cost to a video controller.

SUMMARY AND OBJECTS OF THE INVENTION

A video controller integrated circuit selectively generates video and graphics data for displaying a video image on at least a portion of a graphics display. A video port receives video data from an external data source. A video port FIFO coupled to the video port receives and stores the video data. A display memory bus coupled to the video port FIFO receives the video data from at least the video port FIFO and stores the video data in a display memory. A control means, coupled to the video port FIFO and the display memory bus, controls access to the display memory bus in video port FIFO cycles.

The control means controls the video port FIFO to transfer video data during a first predetermined number of memory cycles from the video port FIFO to the display memory bus during a video port FIFO cycle. The control means monitors the memory cycles during the video port FIFO cycle to detect a non-aligned memory cycle and interrupts a video port FIFO cycle if a non-aligned memory cycle is detected.

A CRT FIFO coupled to the display memory bus and the control means retrieves and stores video data from a display memory. An output port, coupled to the CRT FIFO receives and outputs a portion of the video data from the CRT FIFO. The control means controls the CRT FIFO to transfer video data during a second predetermined number of memory cycles from the display memory bus to the CRT FIFO during a CRT FIFO cycle. The control means monitors the memory cycles during the CRT FIFO cycle to detect a non-aligned memory cycle (e.g., page miss) and shortens a subsequent video port FIFO cycle if a non-aligned memory cycle is detected. The control means shortens the subsequent video port FIFO cycle by reducing the first predetermined number of memory cycles in a subsequent video port FIFO cycle.

Thus, even if a non-aligned page miss occurs, the amount of time needed to fill CRT-FIFO and empty VP-FIFO is less than or equal to the time used when no non-aligned page miss occurs. The worst case for memory bandwidth calculation now corresponds to a normal case with no non-aligned page misses.

A CPU input port connects to an external CPU and receives text and graphics data from an external CPU. A text and graphics controller coupled to the CPU input port and the control means receives text and graphics data. The control means transfers text and graphics data from the text and graphics controller to the display memory during a CPU cycle.

Data accumulated in the video port FIFO when the control means interrupts a video port FIFO cycle is transferred to the display memory during a retrace interval of the video data from the video port.

It is an object of the present invention to optimize the data bandwidth of a non-aligned random memory access to a DRAM with a page mode.

It is a further object of the present invention to optimize the data bandwidth of a random access memory while minimizing the size of data buffers.

It is a further object of the present invention to eliminate discontinuities in data flow when a non-aligned page miss is encountered during page mode addressing of a random access memory.

BRIEF DESCRIPTIONS OF THE DRAWINGS

DETAILED DESCRIPTION OF THE INVENTION

Figure 1:
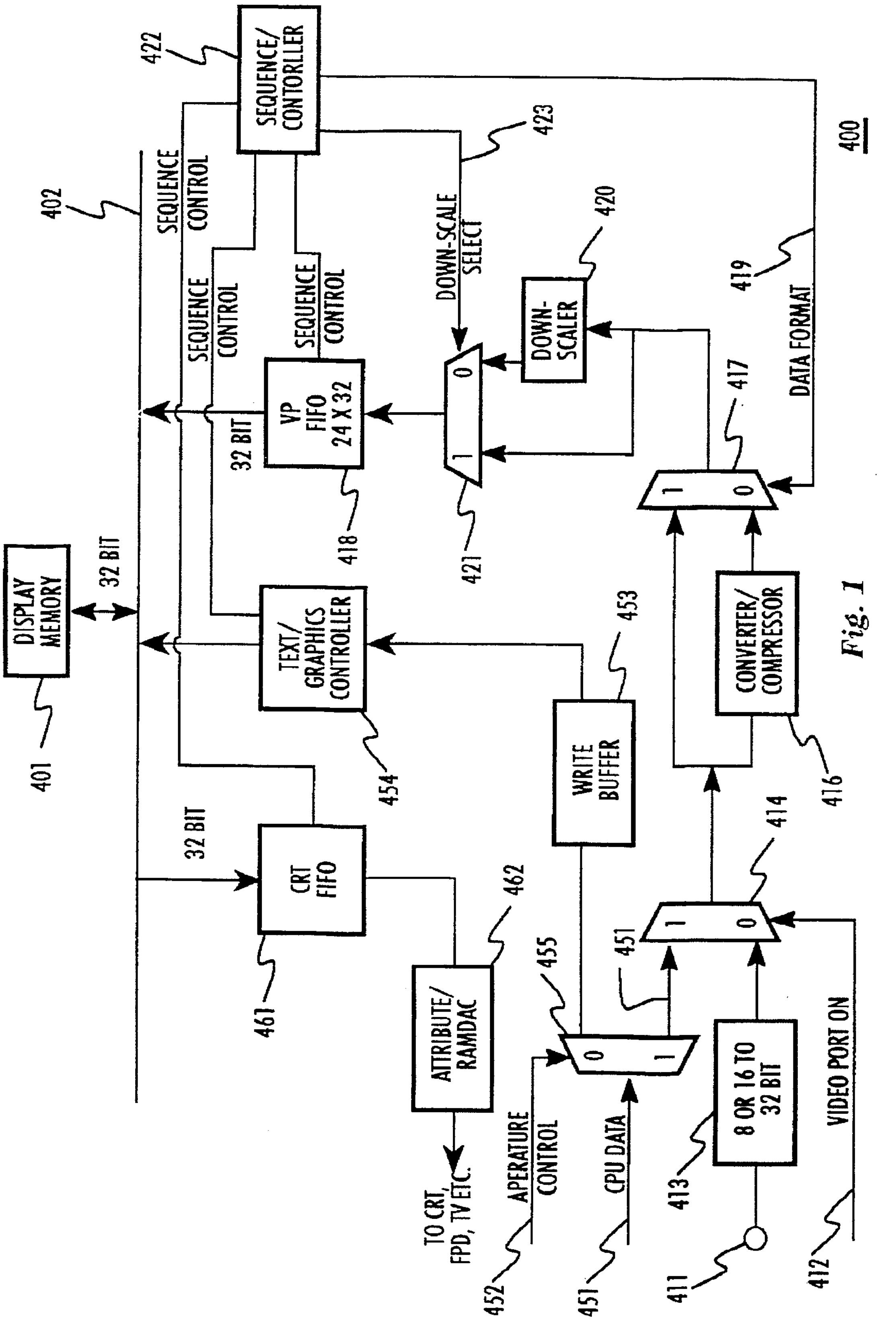
FIG. 1 is a block diagram illustrating a preferred embodiment of the present invention.

FIG. 1 is a block diagram of video controller 400 of the present invention. Video controller 400 may comprise, for example, an integrated circuit which may be used to generate display signals for a computer (e.g., personal computer or the like). Such an integrated circuit may be incorporated into a video controller "card" (e.g., CGA, EGA, VGA, SVGA card or the like) or may be incorporated into a computer motherboard (e.g., laptop, notebook, or palmtop computer or the like).

Video controller 400 may be provided with a display memory 401. For the purposes of this application, the term display memory is used to avoid confusion between the terms "display" and "video". In the prior art and in the video controller art, it is common to refer to a memory for storing image data to be displayed on a CRT, flat panel display, TV or the like as "video memory" or "VMEM". However, with the advent of multimedia computer systems, the term "video memory" may be somewhat misdescriptive or confusing. Thus, the term "display memory" 401 is used in this application to designate a memory (e.g., DRAM or the like) for storing display data to be refreshed to a display (e.g., CRT, flat panel display, TV or the like).

Referring to FIG. 1, video port 411 is provided for inputting video data. As used in this application, the term video data may include live action or full motion video data or the like, such as digitized television video data (NTSC, PAL, SECAM, or HDTV) or other types of video or image data (e.g., MPEG or JPEG encoded/compressed video or the like). Video port 411 may comprise, for example, an eight bit or sixteen bit video port for receiving video data. Video data may be input in one of a number of known formats (e.g., RGB, YUV or the like) or a compressed video format (e.g., MPEG, JPEG or the like).

Data from video port 411 may then be stored in display memory 401 for generating a video display on a CRT, flat panel display, television monitor or the like. Video controller 400 may comprise a Motion Video Architecture™ system for displaying video data, for example, in a motion video window. Motion Video Architecture™ or MVA™ is a trademark of Cirrus Logic, Inc. for a system architecture for generating and displaying full motion or live action video on a computer video display. Aspects of Motion Video Architecture™ are described in co-pending U.S. patent application Ser. No. 08/235,764 filed Apr. 29, 1994, entitled "Variable Pixel Depth and Format for Video Windows", and incorporated herein by reference. Co-pending application Ser. No. 08/235,764 describes how video data may be incorporated into a graphics display (e.g., Windows™ display) as a motion video window.

Video data retrieved from video port 411 may be processed by video controller 400 and may be stored in an off-screen portion of display memory 401 which may be outside the address range of nominal video graphics. Video data may be stored in display memory 401 in a compressed format such as 4:2:2 YUV format (four bits of luminance data and four bits of chrominance difference data). Alternatively, other types of formats may be used such as a proprietary format of Pixel Semiconductor Corporation (city state?) known as PackJR™ or AccuPack™. This proprietary format is described in U.S. Pat. No. 08/223,845, filed Apr. 6, 1994, entitled "Apparatus, Systems, and Methods for processing video data in conjunction with a multi-format frame buffer", and incorporated herein by reference. Although shown here as being stored in an eight bit format, other numbers of bits per pixel may be used without departing from the spirit and scope of the invention.

Data fed to video port 411 may come from a variety of sources. For example, an analog television signal such as an NTSC, PAL, SECAM signal or the like may be received from a cable television or satellite tuner/decoder, TV tuner, VCR, or the like and converted into digital form (RGB, YUV or the like) and fed to video port 411. Similarly, digital television signals such as HDTV or the like may be fed to video port 411. In addition, an MPEG decoder may be connected to video port 411 and may transfer decoded video data through video port 411 into off-screen portions of display memory 401.

Display memory 401 is coupled to video port 400 through data bus 402. Data from video port 411 may first be converted from eight or sixteen bit data to 32-bit data in data converter 413. Each 32 bit dword from data converter 413 may comprise, for example, four eight bit bytes. Each eight bit byte may represent one pixel of data. Alternately, if video data is in a sixteen bit per pixel format, each dword may comprise two sixteen bit pixel words.

Data from data converter 413 may then be transferred through MUX 414. MUX 414 may be selected by video port ON signal 412 to selectively transfer data from video port 411 through data converter 412. Video port ON signal 412 may be generated from an external CPU (not shown) or combinational logic circuitry (not shown) such that data from video port 411 is transferred only when video port 411 is enabled by a user. Video port 411 may be enabled by a user through a graphical user interface (GUI) operated by the aforesaid external CPU (not shown) which in turn may generate video port ON signal 414.

If video port 411 is not enabled by video port ON signal 412, CPU data 451 may be transferred from the aforesaid external CPU (not shown) though MUX 414. Aperture control signal 452 may be provided from external CPU to control the data path of CPU data 451. Aperture control signal 452 may control a range of memory addresses which an external CPU or other device may write data into display memory 401. This range of memory addresses may be known as an "aperture". Thus, an external CPU or other device may write CPU data 451 into different locations in display memory 401.

For an external CPU using a PCI bus system, two apertures may be defined by which the external CPU writes data into display memory 401. For example, external CPU host bus may write to display memory 401 from a third megabyte of display memory 401 through a first aperture. A second aperture may allow external CPU host bus to write to display memory 401 from a fourth megabyte of display memory 401.

Aperture control may be useful in Motion Video Architecture™ applications. For example, if an MPEG decoder is to be used, a first aperture of display memory 401 may be assigned to the MPEG decoder, while a second aperture may be assigned to an external CPU. Either element (MPEG decoder or CPU) may access display memory 401. The address ranges of the two apertures may address the same portions of memory. For example, the first address of the third megabyte of display memory 401 may be the identical location as the first address of the fourth megabyte of display memory 401. Display memory 401 may comprise only one megabyte. Video controller 400 recognizes the address aperture information and directs data to the appropriate portion of display memory 401.

Recognition of address range can be used to alter the technique by which video controller 400 processes data. For example, an external CPU may put the graphics controller in a special write mode (e.g., any mode other than VGA write mode 0). When data comes from the second aperture from the MPEG decoder, data will not be processed in that special write mode. Thus, aperture control signal 452 may control how graphics controller 400 processes data.

32 bit data from MUX 414 passes to converter/compressor 416 to be converted and/or compressed. Converter/compressor 416 may convert video data from RGB to YUV format if the data is not already in YUV format. Once converted into YUV format, video data (e.g., sixteen bit video data) may be compressed into one of a number of compressed formats such as 4:2:2 YUV, PackJR™ or Accupack™ formats or the like. For example, data in a sixteen bit per pixel format may be compressed into an eight bit per pixel equivalent format in converter/compressor 416.

Data output from converter/compressor 416 may then pass through MUX 417 which may select either compressed/converted data or data directly from video port data write buffer 415, depending on the format of video data input from video port 411 and selected conversion or compression formats. MUX 417 may be selected by data format select line 419 which may be driven by sequencer/controller 422, appropriate combinational logic circuitry or the aforesaid external CPU (not shown).

Data from MUX 417 may then be passed to scaler 420. Scaler 420 may scale captured motion video image data, both horizontally and vertically to either expand or contract an image to a particular size or normalize the image to a scan line resolution of an output display. The output of scaler 410 is fed to MUX 421. MUX 421 is controlled by scale select line 423 which may be driven by sequencer/controller 422 to select a scaled or non-scaled image. The output of MUX 421 is fed to video port FIFO 418. Video port FIFO 418 may comprise, for example, a 32 bit wide FIFO twenty-four layers deep.

The term captured motion video image data refers to data input to video port 411 which may be scaled in scaler 410. Captured motion video image data is stored in display memory 401. A portion or all of the captured motion video image data may then be displayed on a CRT, flat panel display or TV in a display window.

Scaler 420 may convert input motion video image data and compress video data to reduce memory data bandwidth requirements. For example a number of pixels may be discarded or averaged together. In addition, even and odd field data for a single frame may be combined in such a manner to reduce flicker. An example of such a technique is shown, for example, in copending application Ser. No. 08/316,167, entitled "Flicker Reduction and Size Adjustment for Video Controller with Interlaced Video Output", filed Sep. 30, 1994 and incorporated herein by reference.

CRT FIFO 461 may be coupled to bus 402 for receiving graphics and motion video data. CRT FIFO 461 may be 32 bits wide and sixteen layers deep. Data from display memory 401 may be used to refresh a video display such as a CRT, flat panel display, television, or the like.

Data from CRT FIFO may then be fed to attribute controller/RAMDAC 462 which may be substantially similar to an attribute controller and RAMDAC of the prior art. An attribute controller may control attributes of video data, for example, in a text mode. Attributes may include foreground color, background color, reverse video, blink, or the like. The RAMDAC may comprise a combined look up table (RAM) which receives graphics data as addresses for the lookup table. The contents at an address in the look up table are then output as pixel data. The DAC, or digital to analog converter portion of the RAMDAC may comprise a series of current sources which may be activated by individual bits cf pixel data to generate an analog output video signals. It should be noted that a digital display, such as a flat panel display or the like may not require the use of the DAC portion of the RAMDAC. Similarly, the RAM portion of the RAMDAC may be bypassed if desired.

Graphics or text data may be received from the aforesaid external CPU (not shown) through DEMUX 455 and selectively transferred to display memory 401 through video port FIFO 418 or though text and graphics controller 454. If the data from the aforesaid external CPU (not shown) is video or video type data (e.g., motion video data, or data intended to be displayed or merged with motion video data) aperture control signal 452 may direct this data though the video port data flow path (i.e., video port FIFO 418).

If the data from the aforesaid external CPU (not shown) is conventional graphics or text data (e.g., data for graphics or text modes of VGA, EGA, CGA, or MGA graphics adapters or the like), aperture control signal 452 may direct such data through a write buffer 454 (e.g., FIFO or the like) and through text/graphics controller 454. Text/graphics controller 454 may comprise, for example, a VGA graphics controller as is known in the art. Text/graphics controller 454 may store text or graphics data into display memory 401 as character and attribute data (i.e., text) or as pixel data (i.e., graphics) as is known in the art.

When a motion video image is displayed on a display device such as a CRT, flat panel display, television or the like, data may be input from video port 411, passed through video port FIFO 418, stored into display memory 401, read out from display memory 401, passed through CRT FIFO 461 and transmitted to a video display in a continuous series of read and write cycles. Each device accessing display memory 401 may access display memory 401 during different time periods or cycles such that simultaneous access to display memory 401 is avoided.

During a video port cycle, data may be transferred from video port FIFO 418 to display memory 401. During a CRT FIFO cycle, data may be read from display memory 401 to CRT FIFO 461. During a CPU cycle, data (e.g., graphics or text data or the like) may be written from text graphics controller 454 to display memory 401 from the aforesaid external CPU (not shown). Video port cycles may comprise a number of memory cycles (e.g., eight) transferring data from video port FIFO 418 to display memory 401. Each memory cycle in turn may comprise a random access memory cycle or a page mode memory cycle. Page mode memory cycles may require, for example, two memory clock cycles, while random access memory cycles may require, for example, nine memory clock cycles. Similarly, CRT FIFO cycles may comprise a number of memory cycles (e.g., eight) transferring data from display memory 401 to CRT FIFO 461.

Generally, data may be written to or from display memory 401 may in sequential order using page mode addressing. Page mode addressing may require only one or two clock cycles per memory cycle. A random access memory cycle may require six or more memory clock cycles, typically nine. Page mode addressing generally may be initiated by a random access memory cycle to load an initial memory address.

From video port FIFO 461, data may be written to display memory 401, starting with a random cycle, then reading in a predetermined number of page cycles or until video port FIFO 418 is empty. In this instance the term "empty" may refer to the condition of a FIFO pointer which may be set to an empty level even if data is present in video port FIFO 418.

For CRT FIFO 461, data may be read from display memory 401, starting with a random cycle, then reading in page cycles until the FIFO is full. In this instance the term "full" may refer to a predetermined level to which the FIFO may be filled (e.g., eight levels). Each level may be defined as one 32 bit dword.

In order to provide motion video without discontinuities, use of memory bandwidth must be optimized. Depending on the amount of buffering available for motion video image data (e.g., amount of memory available for video data in display memory 401), the analysis of memory bandwidth for display memory 401 may be reduced to an evaluation of memory bandwidth required for one frame, one scan line or one or more CRT-FIFO fills. A large memory buffer, such as a frame buffer, for storing one entire frame of video data, may require less memory bandwidth. Display memory accesses may be spread over vertical and horizontal non-display time if a full frame buffer is available. However, such frame buffers are expensive and require a larger amount of memory. Thus, it may be preferable to use a smaller buffer for video data.

One limitation of the system of FIG. 1 is the data bandwidth of display 401. In order to provide life like full motion video images in a display, it may be necessary to transmit data from video port 411 to an output display at a high rate. However, a problem may occur when transferring video data at or near the data bandwidth limitations of video controller 400. If a page boundary is encountered when a memory access is made, the next memory operation may be a random access operation, which may take additional memory clock cycles. If the overall controller is operating at or near its data bandwidth capacity, such a page miss may cause an interruption in data flow.

In general, due to the configuration of display memory 401, a page miss may be encountered no more than once per display line. Display memory 401 may comprise two 256K by 16 DRAMS, whose page is 512 words. Thus, one page may comprise 1024 pixels at sixteen bits per pixel or 2048 pixels at eight bits per pixel. For a 1000 pixel horizontal resolution, a page miss may occur no more than once per line.

In order to prevent interruption of data flow, the control of the video port FIFO 418 and CRT FIFO 461 may be modified. Note that video port FIFO 418 is provided with eight additional levels over CRT FIFO 461. For video port FIFO 418, a predetermined number of memory cycles may be performed during each video port cycle (e.g., eight). This predetermined number may be stored in a first data register (not shown) in controller 400. In the preferred embodiment, eight memory cycles are performed during each video port cycle. So long as no non-aligned cycles are detected, a fixed number of memory cycles equal to a number stored in a control register are executed.

If a non-aligned memory cycle (i.e., non-page mode) is detected during a video port cycle, then the video port memory cycles are stopped before the execution of the non-aligned memory cycle. Further data from video port FIFO 418 for that video port cycle may remain in video port FIFO 418 at that time. The reserve size of video port FIFO may be programmably selected in another control register (not shown) in video controller 400.

Processing then passes to the CRT FIFO cycle, and data is read from display memory 401 to CRT FIFO 461. Since display memory 401 may contain an entire frame of video data, image data may be read out from display memory 401 even if new image data has not been read in from video port FIFO 418. As a video image may not change substantially from frame to frame, the use of image data from a preceding frame may not be noticeable to a user, due to the persistence of vision effect of the human eye.

The video port frames and the display frames may be asynchronous. Pixels may be generated at one rate and read at a different rate. It is possible to synchronize the display such that it shows always a full video port frame. However, the data rate of the video port, in general, is slower that the output port of a video controller.

At the end of a scan line, video port FIFO 418 may contain additional data representing the last few pixels for a particular line. During the horizontal retrace period, this data may be transferred to display memory 401, completing the transfer of image data. In this manner, when a page boundary is encountered, the flow of data is not interrupted. Since a page boundary may require a random access memory cycle, processing delays may be introduced if controller 400 attempts to transfer video data from video port FIFO 418 to display memory 401 when a page boundary occurs. Such delays may introduce a ripple effect, subsequently delaying processing of subsequent data throughout video controller 400.

By terminating a video port cycle when a page boundary is reached, such delays and ripple effects are avoided. Each video port cycle may begin with a page mode memory access, thus the processing of data at the page boundary may be performed during the next video port cycle. Data continues to be transferred through FIFO 418, however, since extra data has been left in video port FIFO 418 when the page boundary was detected, the operating size (i.e., depth) of video port FIFO 418 has been effectively increased. Data will continue to propagate through video port FIFO 418 until the end of the scan line, at which time, any left over data will be transferred to display memory 401 during the horizontal retrace period.

A similar situation can also occur during a CRT FIFO cycle. If a page boundary is encountered during a CRT FIFO cycle, additional clock cycles may be required to perform a random access memory cycle from display memory 401. These additional clock cycles may disrupt the subsequent flow of data, which may introduce a ripple effect, delaying subsequent processing steps. One technique to overcome this problem may be to use faster DRAM for display memory 401 with corresponding faster memory controller and memory clock frequency. However, the necessary increase in frequency may be substantial and faster DRAMs and memory controllers may be more expensive to implement.

During a CRT FIFO cycle, a predetermined number of memory cycles are executed to transfer data from display memory 401 to CRT FIFO 461 (e.g., eight). The predetermined number of memory cycles performed during a CRT FIFO cycle may be programmed in a second data register (not shown) in video controller 400. In a preferred embodiment, the predetermined number of memory cycles may be eight. During a CRT FIFO cycle if a page miss (non-aligned cycle) is encountered, data for that cycle is transferred from display memory 401 to CRT FIFO 461 and processing may not be interrupted.

In order to maintain overall data flow, loading of CRT FIFO 461 continues through the predetermined number of cycles programmed in a second data register (not shown). Since a non-aligned (e.g., random access) memory cycle may take, for example, nine memory clock cycles to execute and a page mode memory cycle may take, for example, two memory clock cycles, an additional seven clock cycles may be needed to process a random mode memory cycle when a page miss is encountered during a CRT FIFO cycle. The difference is made up by performing less video port memory cycles during the next video port cycle.

During the next video port cycle, a number of memory cycles may be reduced. For example, presuming a page mode cycle takes two memory clock cycles to execute and a random access memory cycle take nine memory clock cycles to execute. In order to compensate for a page miss during a CRT FIFO cycle, at least seven fewer memory cycles must be executed during the next video port cycle. Four fewer video port page mode access cycles may be used, thus saving a total of eight memory clock cycles (at two memory clock cycles per page mode cycle) thus compensating for the additional seven memory clock cycles spent in the precedent CRT cycle. Thus, the overall time required for CRT and VP FIFO access is preserved at minimum during horizontal display time reducing memory bandwidth requirements.

A typical video port cycle may comprise eight memory cycles, a first random access memory cycle, and seven page mode cycles (presuming a page miss is not encountered). In order to compensate for the page miss encountered during the preceding CRT FIFO cycle, fewer memory cycles may be executed during the video port cycle. For example, one random access memory cycle may be executed, followed by three page mode cycles, four fewer than during a typical video port cycle. Since each page mode cycle takes two memory clock cycles, a total of eight fewer memory clock cycles are performed in the video port cycle, more than compensating for the seven extra memory clock cycles generated from the page miss encountered during the previous CRT FIFO cycle.

The number of memory cycles per CRT FIFO cycle or video port cycle is determined by predetermined numbers stored in first and second data registers (not shown) respectively. The number of memory cycles for a video port cycle may be altered by altering the contents of the second data register (not shown) or by altering the output of the second data register (not shown) through sequencer/controller 422.

Of course, it may be possible that a page miss may also be encountered in a video port cycle immediately following a CRT FIFO cycle where a page miss occurs. In such an instance, processing of the video port cycle is interrupted as before and the video port cycle terminated. Since the video port cycle is terminated prematurely, the additional memory cycles required to compensate for the page miss in the CRT FIFO cycle are compensated for. As before, additional data may accumulate in video port FIFO 418. At the end of a horizontal line (or vertical interval) additional time is available to transfer this data from video port FIFO to display memory 401.

For a video signal such as an NTSC video signal or MPEG encoded video signal, a horizontal retrace period may be provided on the order of 4 to 6 μsec, depending on graphics mode. For example, for a display having 640 by 480 pixel resolution, the horizontal retrace period may be about 6 μsec. For a pixel resolution of 800 by 600, approximately 5 μsec may be used for horizontal retrace. For a pixel resolution of 1024 by 768, approximately 4 μsec may be used. For a typical memory clock, a page mode cycle may require approximately 30 to 40 nsec, whereas a random access memory cycle may require approximately 130–150 nsec. During the horizontal retrace period, no new video data is input to video port FIFO 418. Thus, the backlog of data accumulated due to page misses in either the video port cycle or CRT FIFO cycle may be transferred from video port FIFO to display memory 401. In this manner, video port FIFO 418 is returned to its original fill level state when the next horizontal line of video data in input. In effect, the video port FIFO uses the horizontal retrace period to "catch up" on the backlog of data accumulated due to page misses.

It may be preferable to alter the performance of video port FIFO to compensate for page misses as opposed to CRT FIFO, as video data (e.g., NTSC video or the like) may be received at a lower data rate. As discussed above, 25/16 to 6.4 CRT frames may be required for each frame of input video data. Thus, video port FIFO 418 need not be increased as much as CRT FIFO 461, if the CRT FIFO were to be used to compensate for page misses.

Control of video port FIFO 418 and CRT FIFO 461 is typically controlled by a sequencer/controller 422 within video controller 400. Sequencer/controller 422 the sequence of memory cycles including the CRT FIFO memory cycle, the video port memory cycle and CPU memory cycle. At the end of an input vertical line, sequencer/controller 422 also controls the loading of any held over data from video port FIFO 418 to display memory 401. At the end of each vertical line received at video port 411, video port FIFO data may be saved in display memory 401 and the video port FIFO 418 may be flushed.

Sequencer/controller 422 contains an arbiter (not shown) which arbitrates between different cycles (video port cycle, CPU cycle and CRT FIFO cycle). Each FIFO may have a write pointer and a read pointer. These pointers may indicate whether a FIFO is empty or full. The pointers may be modified in order to control the FIFOs. To interrupt a FIFO cycle, a pointer may be set to indicate that the FIFO is full (e.g., CRT FIFO) or that a FIFO is empty (e.g., video port FIFO) even though the FIFOs are not at their predetermined empty or full levels.

Figure 2:
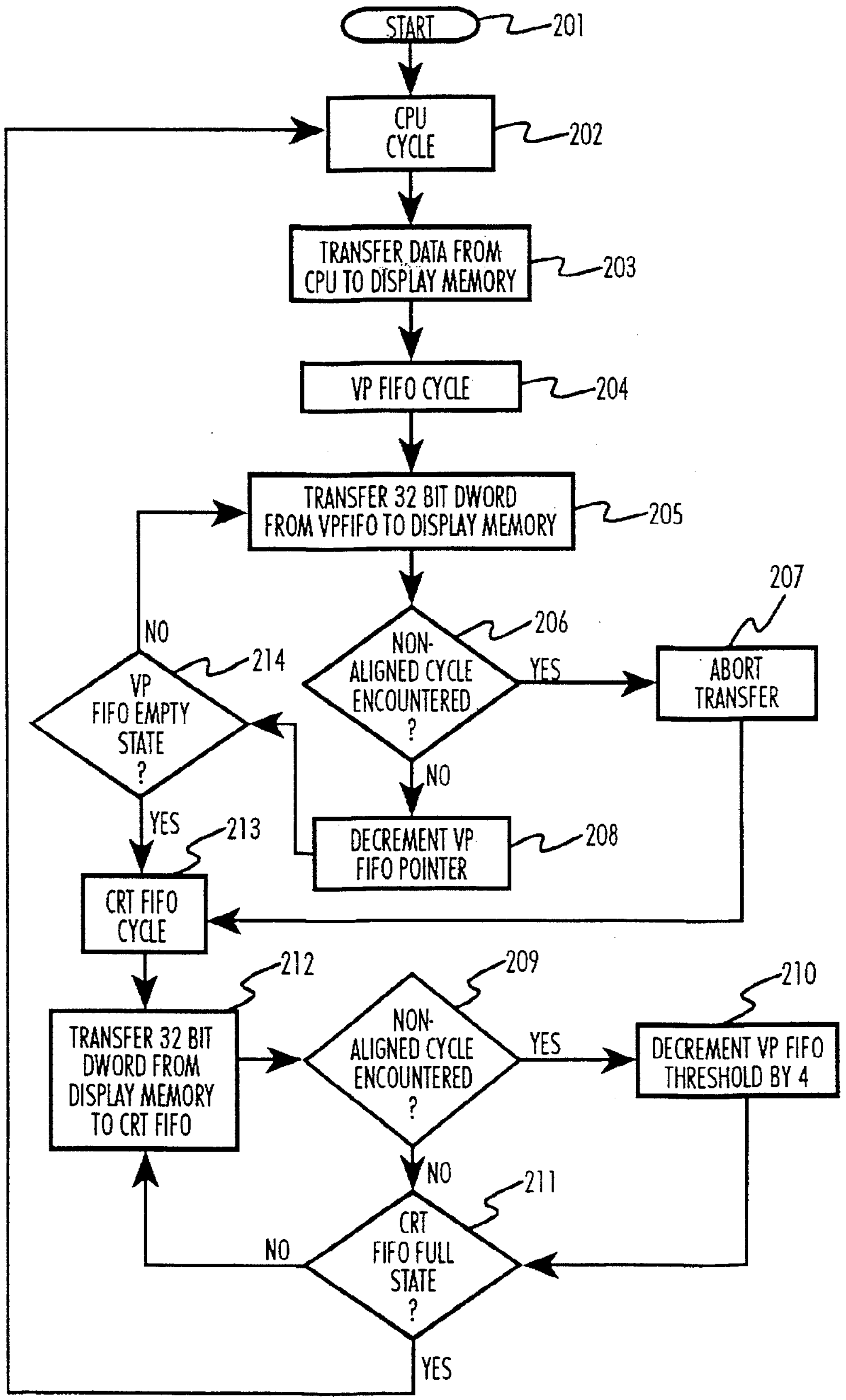
FIG. 2 is a flow chart illustrating the operation of the sequencer/controller of FIG. 1.

FIG. 2 is a flow chart illustrating the operation of sequencer/controller 422. Sequencer/controller 422 starts at step 201 and initiates a CPU cycle 202. In step 203, data is transferred from the aforesaid external CPU (not shown) to display memory 401 through text/graphics controller 454. When a predetermined number of memory cycles have occurred, or no further data is available for transfer to display memory 401, the CPU cycle is terminated and processing passes to step 204.

In step 204 a video port FIFO cycle is initiated. In step 205, a 32 bit dword of video data is transferred from video port FIFO 418 to display memory 401. In decision step 206, sequencer/controller 422 detects whether a non-aligned cycle (e.g., page miss) is to occur. Such a non-aligned cycle may be detected from the address latched to display memory 401. If the address latched in display memory 401 is at a page boundary, a non-aligned cycle will occur as a random access memory cycle may be required to load the first address for the next page of memory.

Note that in decision step 206, the first cycle of each video port FIFO cycle is not compared to determine whether a non-aligned cycle will occur, as the first cycle of a video port FIFO cycle usually will be a random access memory cycle. Thus, the detection in step 206 is carried out only for subsequent memory cycles. If a non-aligned cycle is to occur, processing passes to step 207 and the data transfer is aborted. The video port FIFO cycle is terminated and processing passes to step 213.

If a non-aligned cycle is not detected, the video port FIFO cycle is continued, and the video port fifo pointer within sequencer/controller 422 is decremented in step 208. If the video port FIFO pointer indicates an empty state, as detected in step 214, the video port cycle is terminated and processing passes to step 213. Otherwise, processing passes to step 205 and the next 32 bit dword is transferred from video port FIFO 418 to display memory 401.

In step 213, a CRT FIFO cycle is initiated. In step 212 a 32 bit dword is transferred from display memory 401 to CRT FIFO 461. This 32 bit dword may comprise video data, graphics or text data for display on a CRT, flat panel display, television monitor or the like. In step 209, sequencer/controller 422 detects whether a non-aligned cycle (e.g., page miss) is detected. Again, in the decision step 209, non-aligned cycles are only detected for the second and subsequent cycles of the CRT FIFO cycle, as the first memory cycle of a CRT FIFO cycle may usually be anon-aligned (i.e., random access) cycle.

If a non-aligned cycle is detected in a second or subsequent memory cycle of a CRT FIFO cycle, processing passes to step 210. In step 210, the depth of video port FIFO 418 may be adjusted by decrementing the video port FIFO threshold in sequencer/controller 422 by four levels, lowering the video port FIFO "full" state.

In step 211, the CRT FIFO pointer in sequencer/controller 422 is examined to determine whether a full state has occurred. IF CRT FIFO is full, the CRT FIFO cycle is terminated and processing passes to step 202 and a new CPU cycle begun. Otherwise, processing passes to step 212 and another 32 bit dword is transferred from display memory 401 to CRT FIFO 461.

While the preferred embodiment and various alternative embodiments of the invention have been disclosed and described in detail herein, it may be obvious to those skilled in the art that various changes in form and detail may be made therein without departing from the spirit and scope thereof.

For example, it should be appreciated that the present invention may be applied to control FIFOs in other types of data transfer systems in order to increase available memory data bandwidth and/or prevent interruptions in data flow.

What is claimed is:

1. A memory controller apparatus for processing data and reducing an effect of non-aligned page misses during page mode memory access, comprising:

an input port for receiving data;

an input FIFO coupled to said input port for receiving and storing said data;

a memory coupled to said input FIFO for receiving said data from at least said input FIFO and for storing said data;

an output FIFO coupled to said memory and a control means for retrieving and storing at least a portion of said data;

an output port, coupled to said output FIFO for receiving and outputting said at least a portion of said data from said output FIFO; and said control means, coupled to said input FIFO and said memory, for controlling page mode access to said memory in at least input cycles, wherein said control means controls said input FIFO to transfer data in a first predetermined number of memory cycles from said input FIFO to said memory during an input cycle, said control means monitors said memory cycles during said input cycle to detect a non-aligned memory cycle and interrupts an input cycle if a non-aligned memory cycle is detected, said control means further controls said output FIFO to transfer data during a second predetermined number of memory cycles from said memory to said output FIFO during an output cycle, said control means monitors said memory cycles during said output cycle to detect a non-aligned memory cycle and shortens a subsequent input cycle if a non-aligned memory cycle is detected, and said control means shortens a subsequent input cycle by reducing said first predetermined number of memory cycles in a subsequent input cycle.

2. A video controller integrated circuit for selectively generating video and graphics data for displaying a video image on at least a portion of a graphics display and reducing an effect of non-aligned page misses during page mode memory access, said video controller integrated circuit comprising:

a video port for receiving video data;

a video port FIFO coupled to said video port for receiving and storing said video data;

a display memory bus coupled to said video port FIFO for receiving said video data from at least said video port FIFO and for storing said video data in a display memory; and a CRT FIFO coupled to said display memory bus and a control means for retrieving and storing at least a portion of said video data from a display memory;

an output port, coupled to said CRT FIFO for receiving and outputting said at least a portion of said video data from said CRT FIFO; and said control means, coupled to said video port FIFO and said display memory bus, for controlling page mode access to said display memory bus in video port FIFO cycles, wherein said control means controls said video port FIFO to transfer video data during a first predetermined number of memory cycles from said video port FIFO to said display memory bus during a video port FIFO cycle, said control means monitors said memory cycles during said video port FIFO cycle to detect a non-aligned memory cycle and interrupts a video port FIFO cycle if a non-aligned memory cycle is detected, said control means further controls said CRT FIFO to transfer video data during a second predetermined number of memory cycles from said display memory bus to said CRT FIFO during a CRT FIFO cycle, said control means monitors said memory cycles during said CRT FIFO cycle to detect a non-aligned memory cycle and shortens a subsequent video port FIFO cycle if a non-aligned memory cycle is detected, and said control means shortens said subsequent video-port FIFO cycle by reducing said first predetermined number of memory cycles in a subsequent video port FIFO cycle.

3. The video controller integrated circuit of claim 2, further comprising:

a CPU input port for connecting to an external CPU and for receiving text and graphics data from an external CPU; and a text and graphics controller coupled to said CPU input port and said control means for receiving text and graphics data;

wherein said control means transfers text and graphics data from said text and graphics controller to said display memory during a CPU cycle.

4. The video controller integrated circuit of claim 2, wherein said control means transfers data accumulated in said video port FIFO when said control means interrupts an video port FIFO cycle to said display memory during a retrace interval of said video data from said video port.

5. A multimedia computer system for selectively generating video and graphics data for displaying a video image on at least a portion of a display and reducing an effect of non-aligned page misses during page mode memory access, said multimedia computer system comprising:

a video port for receiving video data;

a video port FIFO coupled to said video port for receiving and storing said video data;

a display memory coupled to said video port FIFO for receiving said video data from at least said video port FIFO and for storing said video data; and a CRT FIFO coupled to said display memory and a control means for retrieving and storing at least a portion of said video data from a display memory;

an output display port, coupled to said CRT FIFO for receiving and outputting said at least a portion of said video data from said CRT FIFO; and said control means, coupled to said video port FIFO and said display memory, for controlling page mode access to said display memory in video port FIFO cycles, wherein said control means controls said video port FIFO to transfer video data during a first predetermined number of memory cycles from said video port FIFO to said display memory during a video port FIFO cycle, said control means monitors said memory cycles during said video port FIFO cycle to detect a non-aligned memory cycle and interrupts a video port FIFO cycle if a non-aligned memory cycle is detected, said control means further controls said CRT FIFO to transfer video data during a second predetermined number of memory cycles from said display memory bus to said CRT FIFO during a CRT FIFO cycle, said control means monitors said memory cycles during said CRT FIFO cycle to detect a non-aligned memory cycle and shortens a subsequent video port FIFO cycle if a non-aligned memory cycle is detected, and said control means shortens said subsequent video port FIFO cycle by reducing said first predetermined number of memory cycles in a subsequent video port FIFO cycle.

6. The multimedia computer system of claim 5, further comprising:

a display means, coupled to said output display port, for displaying an image generated from at least a portion of said video data.

7. The multimedia computer system of claim 6, wherein said display means is a cathode ray tube monitor.

8. The multimedia computer system of claim 6, wherein said display means is a flat panel display.

9. The multimedia computer system of claim 6, wherein said display means is a television monitor.

10. The multimedia computer system of claim 5, further comprising:

a CPU for receiving, processing, and outputting at least text and graphics data; and a text and graphics controller coupled to said CPU and said control means for receiving text and graphics data;

wherein said control means transfers text and graphics data from said text and graphics controller to said display memory during a CPU cycle.

11. The multimedia computer system of claim 5, wherein said control means transfers data accumulated in said video port FIFO when said control means interrupts an video port FIFO cycle to said display memory during a retrace interval of said video data from said video port.

12. A method for selectively generating video and graphics data for a video image and reducing an effect of non-aligned page misses during page mode memory access, the method comprising the steps of:

receiving video data in a video port of a video controller, receiving and storing the video data in a video port FIFO from the video port, receiving and storing the video data in a display memory from at least the video port FIFO, retrieving and storing at least a portion of the video data from a display memory in a CRT FIFO, receiving and outputting said at least a portion of said video data from said CRT FIFO from an output port, transferring video data during a first predetermined number of memory cycles from the video port FIFO to a display memory bus during a video port FIFO cycle, monitoring the memory cycles during the video port FIFO cycle to detect a non-aligned memory cycle, interrupting a video port FIFO cycle if a non-aligned memory cycle is detected, transferring video data during a second predetermined number of memory cycles from the display memory bus to the CRT FIFO during a CRT FIFO cycle, monitoring the memory cycles during the CRT FIFO cycle to detect a non-aligned memory cycle, shortening a subsequent video port FIFO cycle if a non-aligned memory cycle is detected, and reducing the first predetermined number of memory cycles in a subsequent video port FIFO cycle.

13. The method of claim 12, further comprising the steps of:

receiving text and graphics data from an external CPU in a text and graphics controller, and transferring text and graphics data from the text and graphics controller to the display memory during a CPU cycle.

14. The method of claim 12, further comprising the step of:

transferring data accumulated in the video port FIFO when due to an interrupt in a video port FIFO cycle to the display memory during a retrace interval of the video data from the video port.

* * * * *